United States Patent [19]

Ando

[11] Patent Number: 5,367,510
[45] Date of Patent: Nov. 22, 1994

[54] DISK RECORDING/REPRODUCING APPARATUS HAVING THE CAPABILITY OF RECORDING AN OPERATOR DESIGNATED PROGRAM SEQUENCE

[75] Inventor: Ryo Ando, Tokyo, Japan

[73] Assignee: Sony Corporation, Tokyo, Japan

[21] Appl. No.: 815,838

[22] Filed: Dec. 30, 1991

Related U.S. Application Data

[63] Continuation of Ser. No. 290,047, filed as PCT/JP88/00365, Apr. 12, 1988, abandoned.

[30] Foreign Application Priority Data

Apr. 15, 1987 [JP] Japan ................................. 62-57319

[51] Int. Cl.$^5$ ............................................. G11B 7/085
[52] U.S. Cl. ......................................... 369/32; 369/50; 369/54
[58] Field of Search ............ 358/342; 360/72.1, 78.04; 369/14, 30, 32, 33, 47–48, 50, 54, 58

[56] References Cited

U.S. PATENT DOCUMENTS

| | | | |
|---|---|---|---|
| 4,779,252 | 10/1988 | Custers et al. | 369/32 |
| 4,788,672 | 11/1988 | Toyooka et al. | 369/32 |
| 4,789,979 | 12/1988 | Hiraoka et al. | 369/32 X |
| 4,862,439 | 8/1989 | Ando et al. | 369/32 X |
| 4,872,151 | 10/1989 | Smith | 369/32 X |

FOREIGN PATENT DOCUMENTS

| | | |
|---|---|---|
| 0164131 | 12/1985 | European Pat. Off. . |
| 0169597 | 1/1986 | European Pat. Off. . |
| 0281415 | 9/1988 | European Pat. Off. . |
| 56-61075 | 5/1981 | Japan . |
| 58-60389 | 4/1983 | Japan . |
| 60-50757 | 3/1985 | Japan . |
| 61-45786 | 7/1986 | Japan . |
| 7901801 | 9/1980 | Netherlands . |

OTHER PUBLICATIONS

Nikkei Electronics, No. 365, Mar. 25, 1985, pp. 167–188.
Patent Abstracts for Japan, vol. 12, No. 319, (P-751)(3166) 30 Aug. 1988 & JP-A-63 083984 (Toshiba Corp.) 14 Apr. 1988.

*Primary Examiner*—W. R. Young
*Attorney, Agent, or Firm*—Limbach & Limbach

[57] ABSTRACT

An optical disk recording/reproducing apparatus generates program selection information and records it on the lead-in region of an optical disk. During reproduction of the programs recorded on the disk, the program selection information is first reproduced from the lead-in region and is used to control the reproduction order of the different programs recorded on the disk.

1 Claim, 5 Drawing Sheets

DISK

FIG. 3 DATA STRUCTURE FOR ONE FRAME

STORAGE OPERATION FOR PROGRAM INFORMATION

LOADING OPERATION FOR
PROGRAM INFORMATION

DISK RECORDING/REPRODUCING APPARATUS HAVING THE CAPABILITY OF RECORDING AN OPERATOR DESIGNATED PROGRAM SEQUENCE

This is a continuation of co-pending application Ser. No. 07/290,047 filed as PCT/JP88/00365, Apr. 12, 1988, now abandoned.

TECHNICAL FIELD

This invention relates to a disk recording/reproducing apparatus and a disk recording/reproducing method for performing recording/reproduction of the play information etc. on or from an optically recordable disk, and may be applied for example to a play or performance apparatus for a recordable/reproducible compact disk (CD).

BACKGROUND OF ART

There is so far known an optical disk on which audio signals such as voice or musical sounds are recorded in digitized form, or so-called compact disk. A player adapted for reproducing the compact disk is usually endowed with a program reproducing function and adapted to reproduce selected ones of the tunes recorded on the disk in the desired sequence. There is also known a player in which the program information for each of a plurality of disks is stored in a memory from which the memory contents are not erased even when the power source is turned off (non-volatile memory) and in which the disk is automatically discriminated and the corresponding program information selected in dependence upon the contents of the table of contents information (TOC information) indicating the record contents to effect program reproduction.

It is noted that the above TOC information is recorded in the lead-in region on the inner peripheral side of the recording region or program area on the disk reserved for recording the play information etc.

While the compact disk is dedicated to reproduction, there is a demand for a disk system which is recordable and which is adapted to maintain compatibility with respect to the compact disk. As an example, a system is proposed which makes use of a magneto-optical disk, it being possible with the disk recording/reproducing apparatus for such system to provide the aforementioned program reproducing function. However, there is a limit to the memory in the recording/reproducing apparatus and to the number of the programs that can be stored. In addition, when the reproduction is to be performed in other apparatus, the same program cannot be reproduced unless the operation of preparing a program is performed again.

The present invention has been proposed in view of the above inconveniences and is aimed to provide a disk recording/reproducing apparatus and a disk recording/reproducing method whereby program reproduction may be easily performed from a large number of disks without employing a memory of larger capacity. The present invention is also aimed to provide a disk recording/reproduction apparatus and a disk recording/reproducing method in which the same program can be reproduced on other apparatus without the necessity of newly performing a program forming operation.

DISCLOSURE OF THE INVENTION

For accomplishing the above object, the present invention is characterized in that a plurality of tunes recorded in the recording region of the optically recordable disk adapted to record the play information etc. are selected by the operation of a tune select key and stored as the program information in program storage means. The program information is then recorded in a lead-in region of the disk provided in proximity to the recording region reserved for the play information etc. At the time of reproduction, the program information recorded in the lead-in region of the disk is transferred to said program storage means and program reproduction is performed in accordance with the program information.

According to the present invention, the program information is recorded in the lead-in region of the disk and program reproduction is performed on the basis of the program information, so that program reproduction can be easily effected from a large number of disks without employing a memory of larger capacity. When the reproduction is performed using other apparatus, the same program can be reproduced without newly performing the program forming operation.

PREFERRED EMBODIMENT TO PRACTICE THE INVENTION

Figure 1:
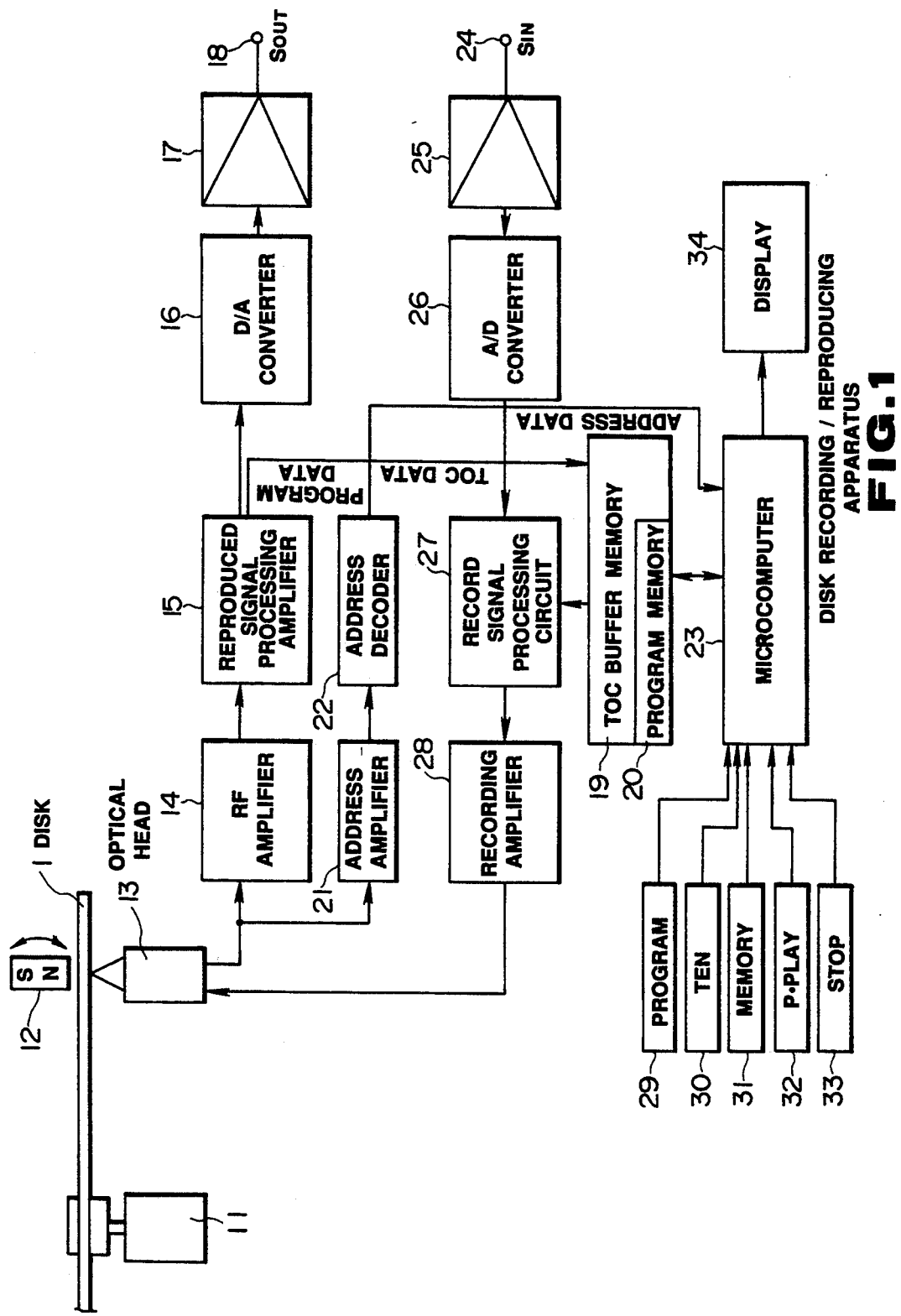
FIG. 1 is a block diagram showing an embodiment of a disk recording/reproducing apparatus according to the present invention.

By referring to the drawings, a preferred embodiment of the present invention will be hereafter explained in detail.

Figure 2:
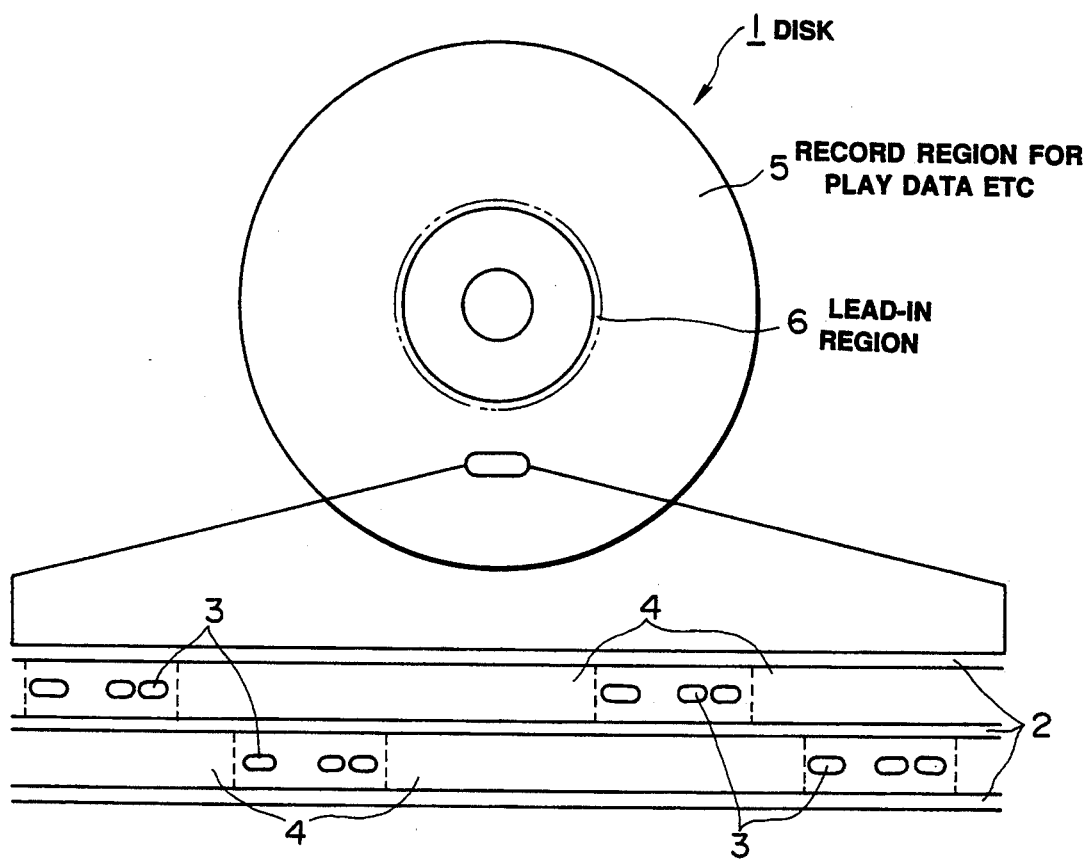
FIG. 2 is a diagrammatic view showing a disk in the above embodiment.

By first referring to FIG. 2, a disk of the present embodiment is explained.

As an example, an optically recordable disk 1 is a photo-magnetic disk which is 12 cm across and which has a vertically magnetizable film exhibiting magneto-optical effects. On the disk 1, there is spirally formed a pregroove 2 acting as a guide groove. On a land between adjacent pregrooves 2, a pre-recorded region 3 in which patterns of projections and recesses are previously recorded along the circumferential direction and a signal recording region 4 in which magneto-optical recording is performed, are formed alternately, each at an equal pitch.

Figure 3:
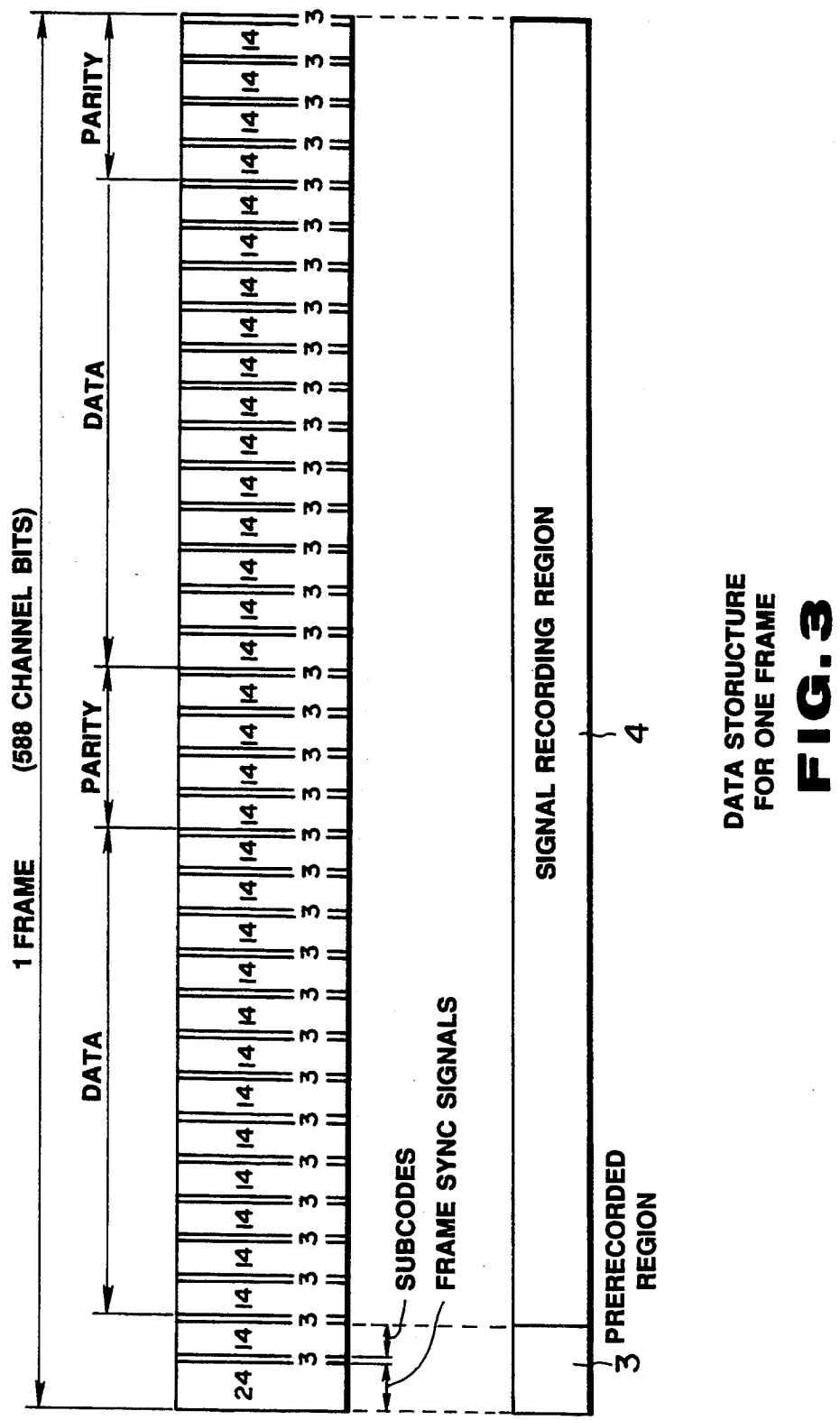
FIG. 3 is a diagrammatic view showing the structure of one frame of data recorded on the disk.

FIG. 3 shows the data structure for one frame, as specified by the compact disk format. Thus one frame is composed of 588 channel bits, and is formed by data that have passed through eight to fourteen modulation (EFM). More specifically, each such frame is made up of 24-bit frame sync signals, 14 bit or 1 symbol subcodes, data such as 14×32 bit or 32 symbol play information, and parity bits. A number of merging bits, each composed of three bits, are provided for connecting the symbols, so that each frame is composed of a sum total of 588 bits.

Among the data making up the aforementioned one frame, the frame sync signals and the subcodes are previously recorded in the prerecorded region 3 by molding as patterns of alternate projections and recesses, while data such as play information and parities may be recorded as the magneto-optical recording in the signal recording region 4.

It will be noted that only the subcodes written into the Q-channel, that is, the absolute address information or absolute time information from the starting end to the terminal end of the recording region 5 for the play information, are previously recorded in the prerecorded region 3.

In the lead-in region 6, formed adjacent to and on the inner peripheral side of the recording region 5 of the disk 1 for the play information etc., there are recorded the TOC information including the tune number, start address (start time) and the end address (end time) and the program information for program reproduction. It is noted that the program information is recorded in succession to, for example, the TOC information.

Next, the disk recording/reproducing apparatus of the present embodiment will be hereafter explained by referring to FIG. 1.

The disk 1 is driven into rotation at a constant linear velocity (CLV) by a spindle motor 11. A magnet 12 and an optical head 13 are disposed for facing to each other on both sides of the disk 1. The magnet 12 affords a magnetic field for recording or erasing the information on or from the disk 1 by taking advantage of the magneto-optical effects, with the direction of the magnetic poles being inverted for recording and erasure. The optical head 13 is composed of a number of optical components, such as laser diode, photodetector, lens or beam splitter, and adapted to record or reproduce the information upon irradiating the disk by a laser beam.

Among the RF signals read out from the disk 1 by the optical head 13, the reproduced signals from the signal recording region 4 are supplied to a reproduced signal processing circuit 15 via an RF amplifier 14 for performing a prescribed signal processing operation. The information reproduced from the recording region 5 for the play information of the disk 1 is transmitted from the reproduced signal processing circuit 15 to a digital-/analog (D/A) converter 16 where it is converted into the corresponding analog information which is then outputted as the reproduced audio signals $S_{OUT}$ at an output terminal 18 via a buffer amplifier 17. On the other hand, the TOC information reproduced from the lead-in region 6 of the disk 1 is transmitted from the reproduced signal processing circuit 15 to a TOC buffer memory 19 so as to be stored in the TOC buffer memory 19. The program information reproduced from the lead-in region 6 is transmitted from the reproduced signal processing circuit 15 to a program memory as the program memory means so as to be stored in the program memory 20. This program memory 20 forms part of the TOC buffer memory 19.

The reproduced signals from the prerecorded region 3 of the disk 1 are transmitted via an-address amplifier 21 to an address decoder 22 and the absolute address information decoded in the address decoder 22 is adapted to be supplied to a micro-computer 23.

On the other hand, the audio signals $S_{IN}$ to be recorded on the disk 1 are transmitted from an input terminal 24 via a buffer amplifier 25 to an analog/digital (A/D) converter 26 where it is converted into digitized form. The output from the A/D converter 26, that is, the play information, is processed in a predetermined manner in a recording signal processing circuit 27 and thence transmitted via a recording amplifier 28 to the optical head 13 so as to be recorded in the recording region 5 on the disk 1 for the play information etc.

To the recording signal processing circuit 27 are connected the aforementioned TOC buffer memory 19 and the program memory 20 such that the TOC information or the program information is recorded in the lead-in region 6 on the disk 1 as the occasion may demand. The TOC buffer memory 19 and the program memory 20 are connected to the microcomputer 23 for exchanging the information. To the microcomputer 23, there are connected operating keys including a program key 29, a ten-key 30, a memory key 31, a program reproducing key 32 and a stop key 33, and a display 34 for displaying the tune number or track number etc.

Figure 4:
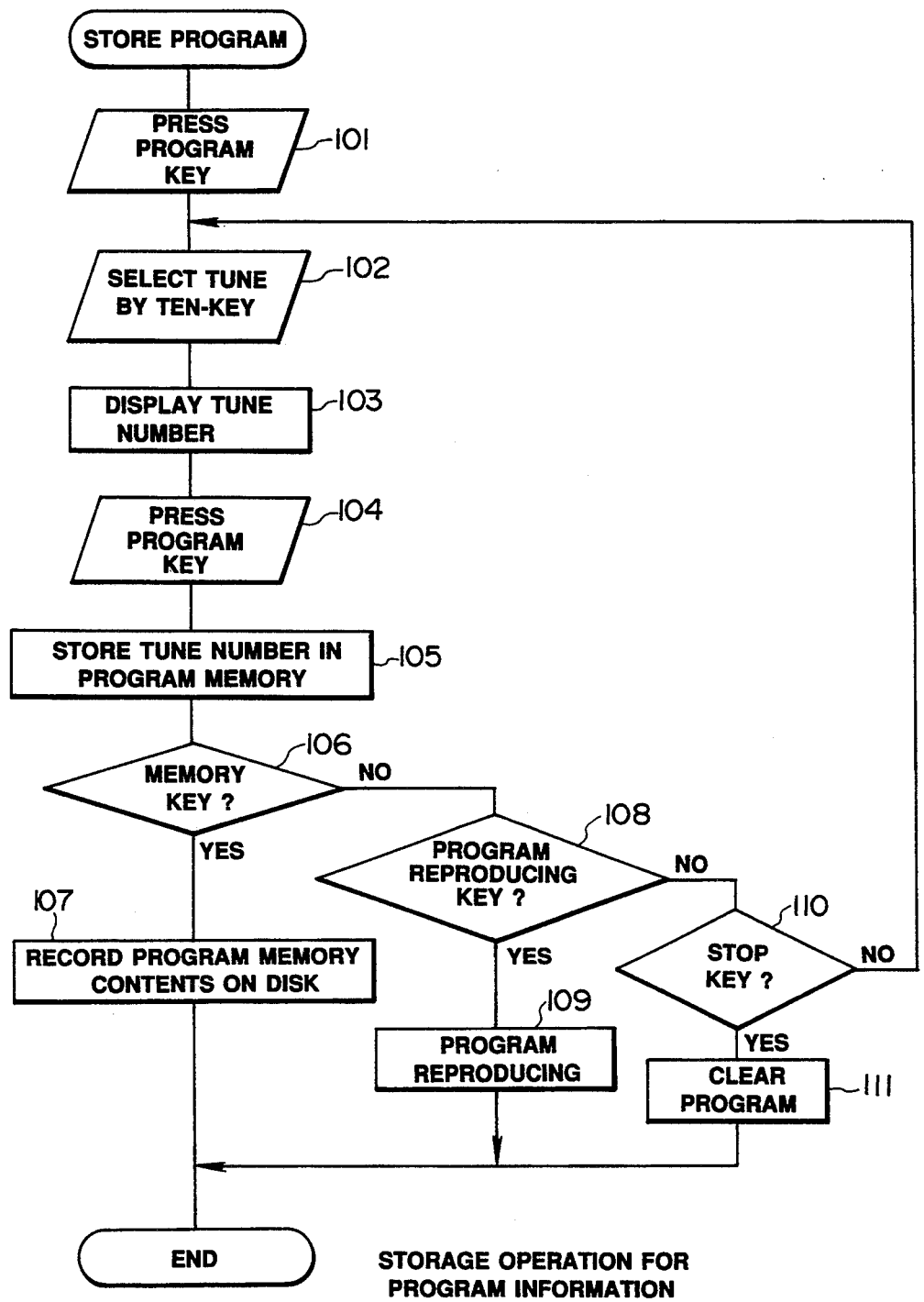
FIG. 4 is a flow chart for illustrating the operation of storing the program information in the disk recording/reproducing apparatus of the above embodiment.

The operation of storing the program information in the above described disk recording/reproducing apparatus is now explained by referring to the flow chart of FIG. 4.

The program key 29 is first pressed to establish a program mode at step 101. The ten-key 30, which is a tune select key, is then used at step 102 to select a tune that is desired to be reproduced first in the program reproduction. At this time, the number of the selected tune or track number is displayed on the display 34 at step 103. The program key 29 is then pressed at step 104 to store the tune number displayed on the display in the program memory 20 at step 105. Then it is decided at step 106 whether or not the memory key 31 has been pressed. If it is found that the key has been pressed, the contents of the program memory 20, that is, the program information, is recorded at step 107 in the lead-in region 6 of the disk 1. If it is found at step 106 that the memory key 31 has not been pressed, it is decided at step 108 whether or not the program reproducing key 32 has been pressed. If it is found at step 108 that the program reproducing key 32 has been pressed, program reproduction is performed at step 109 in accordance with the contents of the program memory or program information. If it is found at step 108 that the program reproducing key 32 has not been pressed, it is decided at step 110 whether or not the stop key 33 has been pressed. If it is found at this step 110 that the stop key 33 has been pressed, the contents of the program memory 20, that is, the program information, is cleared at step 111. If it is found at step 110 that the stop key 33 has not been pressed, the steps 102 et seq. are again executed.

That is, upon repeated execution of the steps 102 through to 105, a number of tunes can be selected sequentially for forming a program. When the memory key 31 is pressed at the time point a program has been completed, the program information is read out from the program memory 20 so as to be recorded in the lead-in region 6 of the disk 1. When the program reproducing key 32 is pressed before pressing the memory key 31, program reproduction may be performed without the program information being written into the lead-in region 6 of the disk 1. Also, when the stop key 33 is pressed before pressing the memory key 31, the contents of the program memory 20 may be cleared.

Figure 5:
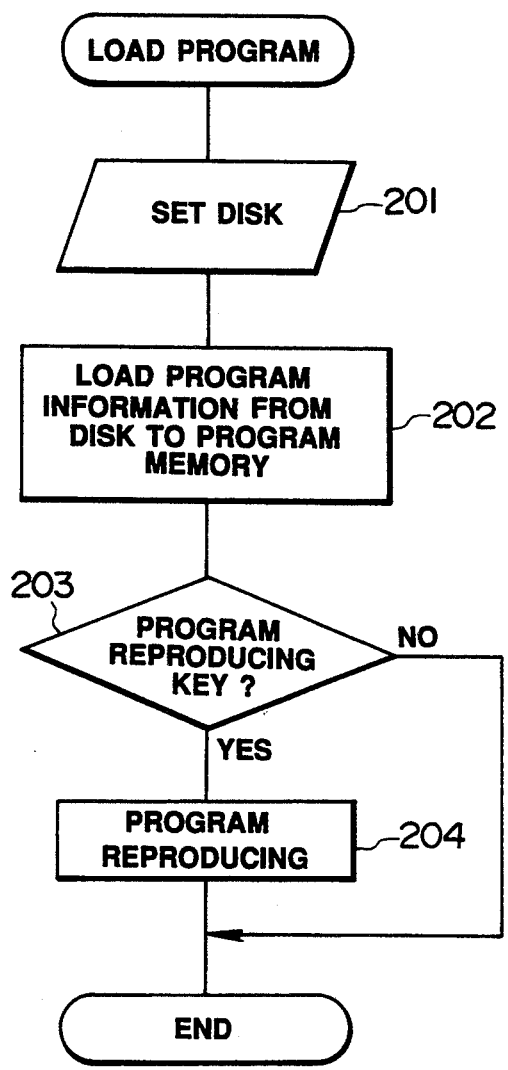
FIG. 5 is a flow chart for illustrating the operation of loading the program information.

The operation of loading the program information will now be explained by referring to the flow chart of FIG. 5. When the disk 1 is placed in position within the apparatus at step 201, the program information recorded in the lead-in region 6 on the disk 1 is read out and transferred or loaded at step 102 to the program memory 20. It is then decided at step 203 whether or not the program reproducing key 32 has been pressed. If it is found that the key 32 has been pressed, program reproduction is performed at step 204 in accordance with the program information transferred to the program memory 20.

It will be appreciated from above that, in the disk recording/reproducing apparatus of the present embodiment, the program information for program reproduction is adapted to be recorded in the lead-in region 6 of the disk 1, such that a program memory having a storage capacity for the program information for one disk suffices as the program memory 20 provided in the apparatus. In other words, program reproduction from a large number of disks may be easily performed without employing a memory of larger capacity. In addition, the same program may be reproduced on some other apparatus without newly performing a program formulating operation.

What is claimed is:

1. An optical disc recording apparatus for using an optical disc which has a recording region and a lead-in region, said lead-in region containing optically recorded play program information comprised of separate programs, said apparatus comprising:

(a) a digital memory for storing program information designating the order in which programs are to be reproduced according to information signals recorded in the recording region of the optical disc;

(b) means for optically recording program information stored in said digital memory in the lead-in region of the optical disc;

(c) operator controllable information select means for selecting a plurality of the information signals recorded in the recording region of the optical disc and storing information representative of information signals selected as the play program information in said digital memory;

(d) display means for displaying data relating to the information signal selected with said operator controllable information select means; and (e) control means for controlling said means for optically recording program information to record the play program information stored in said digital memory in the lead-in region of the optical disc.

* * * * *